United States Patent
Unnimadhavan et al.

(10) Patent No.: US 9,509,606 B2
(45) Date of Patent: Nov. 29, 2016

(54) DISTRIBUTED VIRTUAL PRIVATE NETWORK

(71) Applicant: Aruba Networks Inc., Sunnyvale, CA (US)

(72) Inventors: Sandeep Unnimadhavan, Bangalore (IN); Vamsi Krishna Bandlamudi, Bangalore (IN); Tilak Kumar Adhya, Bangalore (IN); Jagachittes Vadivelu, Bangalore (IN); Anandakrishnan Viswanathan, Bangalore (IN)

(73) Assignee: Aruba Networks, Inc., Sunnyvale, CA (US)

(*) Notice: Subject to any disclaimer, the term of this patent is extended or adjusted under 35 U.S.C. 154(b) by 212 days.

(21) Appl. No.: 14/446,846

(22) Filed: Jul. 30, 2014

(65) Prior Publication Data

US 2016/0036700 A1   Feb. 4, 2016

(51) Int. Cl.

| | |
|---|---|
| *H04L 12/741* | (2013.01) |
| *H04L 12/46* | (2006.01) |
| *H04W 88/08* | (2009.01) |
| *H04W 84/20* | (2009.01) |
| *H04L 29/12* | (2006.01) |
| *H04W 12/00* | (2009.01) |
| *H04L 29/06* | (2006.01) |
| *H04W 12/02* | (2009.01) |

(52) U.S. Cl.
CPC .......... *H04L 45/74* (2013.01); *H04L 12/4641* (2013.01); *H04L 61/103* (2013.01); *H04L 63/0272* (2013.01); *H04W 12/00* (2013.01); *H04W 12/02* (2013.01); *H04W 84/20* (2013.01); *H04W 88/08* (2013.01)

(58) Field of Classification Search
CPC ... H04L 1/1809; H04L 63/164; H04L 45/74; H04L 5/0044; H04L 12/4641; H04L 61/103; H04L 63/0272; G06F 11/2005; H04W 12/00; H04W 12/02; H04W 84/20; H04W 88/08
USPC .................. 370/328, 474; 714/4.11; 380/287
See application file for complete search history.

(56) References Cited

U.S. PATENT DOCUMENTS

| | | | |
|---|---|---|---|
| 7,003,118 B1* | 2/2006 | Yang ...................... | H04L 63/164 370/393 |
| 2013/0142114 A1* | 6/2013 | Ault ...................... | H04L 1/1809 370/328 |
| 2014/0281669 A1* | 9/2014 | DeCusatis ........... | G06F 11/2005 714/4.11 |
| 2014/0369365 A1* | 12/2014 | Denio ..................... | H04L 69/16 370/474 |

* cited by examiner

*Primary Examiner* — Jianye Wu

(74) *Attorney, Agent, or Firm* — Brooks, Cameron & Huebsch, PLLC

(57) ABSTRACT

A system includes: multiple access points, the multiple access points including at least a first access point and a second access point; the system performs operations including: receiving, by the second access point from a client device, a data packet to be transmitted to a device outside of the system; forwarding the data packet by the second access point to the first access point; assigning, by the first access point, a first sequence number to the data packet to be used for transmitting the data packet outside of the system; transmitting the data packet with the first sequence number to the device outside of the system.

20 Claims, 7 Drawing Sheets

DISTRIBUTED VIRTUAL PRIVATE NETWORK

BACKGROUND

In a cluster of network devices, there is often one master network device and multiple slave network devices connected to client devices. The master network device is often responsible for performing one or more functions (e.g., authentication, encryption, etc.) on packets generated by the client devices or incoming packets destined for the client devices. However, because the master device performs these functions on each packet generated by/destined for each client device, it is possible to overload the master device. In such scenarios, the master device becomes a bottleneck and reduces packet throughput.

OVERVIEW

In general, in one aspect, one or embodiments relate to a system. The system comprises: a plurality of access points, the plurality of access points comprising at least a first access point and a second access point; wherein the system is configured to perform operations comprising: receiving, by the second access point from a client device, a data packet to be transmitted to a device outside of the system; forwarding the data packet by the second access point to the first access point; assigning, by the first access point, a first sequence number to the data packet to be used for transmitting the data packet outside of the system; transmitting the data packet with the first sequence number to the device outside of the system.

In general, in one aspect, one or more embodiments relate to a system. The system comprises: a plurality of access points, the plurality of access points comprising at least a first access point and a second access point, wherein the system is configured to perform operations comprising: receiving, by the first access point from a device outside the system, a data packet comprising a payload for a client device connected to the second access point; verifying, by the first access point, an Integrity Check Value (ICV) of the data packet; verifying, by the first access point, a sequence number of the data packet; and forwarding the data packet to the second access point without the first access point decrypting the payload of the data packet.

Other aspects of the embodiments will be apparent from the following description and the appended claims.

DETAILED DESCRIPTION

Figure 1:
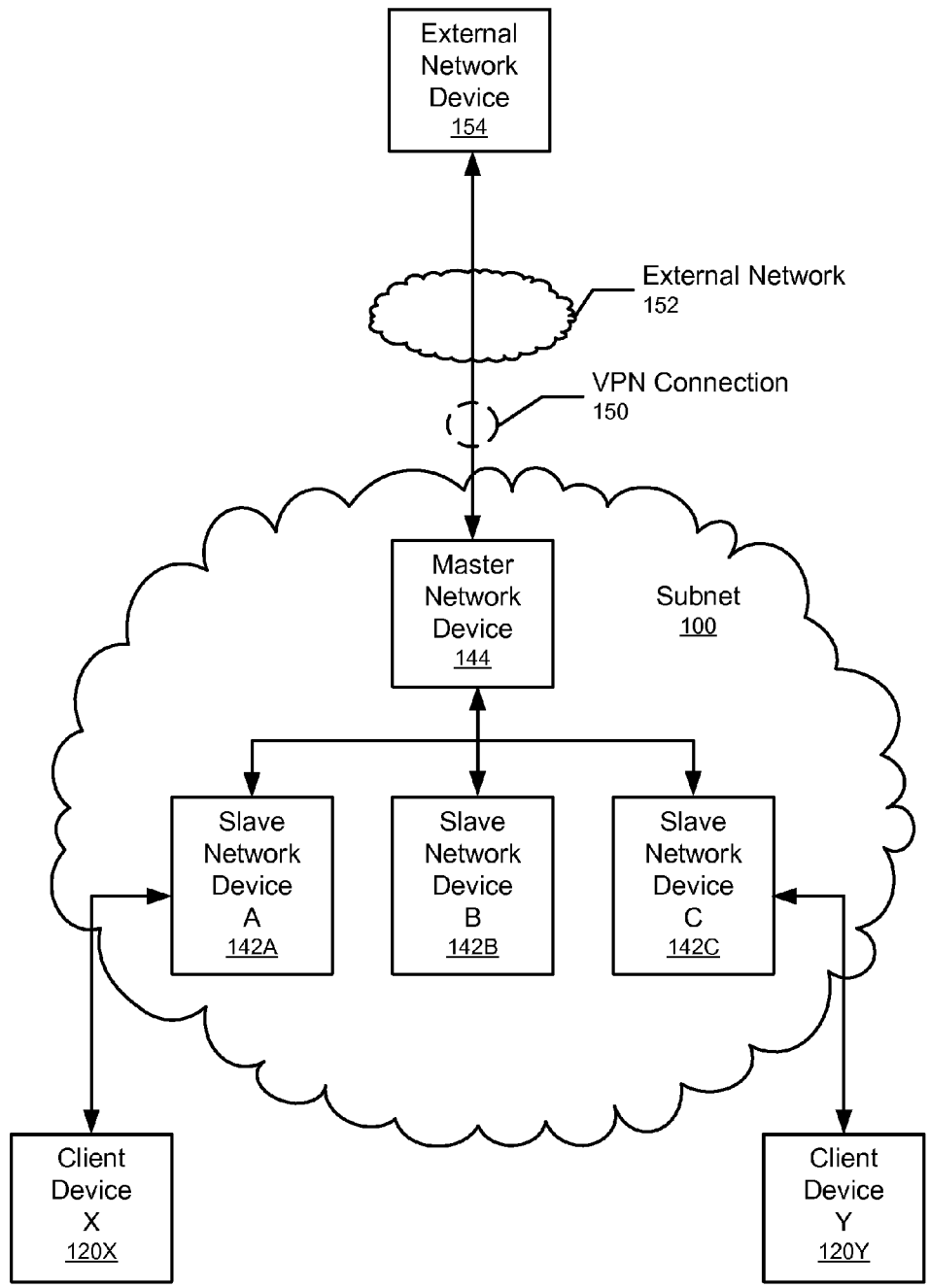
FIG. 1 shows a system in accordance with one or more embodiments.

Specific embodiments will now be described in detail with reference to the accompanying figures. Like elements in the various figures are denoted by like reference numerals for consistency.

In the following detailed description of embodiments numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a system, method, and non-transitory computer readable storage medium for distributing/offloading the virtual private network (VPN) functionality of a master network device among one or more slave network devices in a subset. In the upstream direction, packet sequence number generation is performed by the master network device while packet encryption and calculation of the Integrity Check Value (ICV) may be performed by the master network device or a slave network device. In the downstream direction, packet sequence number verification is performed by the master network device while packet decryption and/or verification of the ICV is performed by the slave network device connected to the client device or another (e.g., randomly selected) slave network device. In both upstream and downstream directions, the workload on the master network device is reduced, lowering the probability that the master network device will become a bottleneck.

FIG. 1 shows a system in accordance with one or more embodiments. As shown in FIG. 1, the system has several components including multiple client devices (e.g., Client Device X (120X), Client Device Y (120Y)), an internet protocol (IP) subnet (100), and an external network device (154). The IP subnet (100) effectively connects the client devices (120X, 120Y) to the external network device (154) using a virtual private network (VPN) connection (150). The IP subnet (100) may be the local network of a corporate/branch campus, an academic institution, a personal residence, a retail establishment, etc. The IP subnet (100) may be of any size and include wired and/or wireless segments. Each of these components (100, 120X, 120Y, 150, 154) is discussed below.

In one or more embodiments, each client device (120X, 120Y) is a computing system. A client device may be a station. For example, the client device may be a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments. The client devices may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor.

In one or more embodiments, each client device (120X, 120Y) is a destination of one or more data packets (or at least packet payloads) coming from the external network device (154). In particular, a client device may execute an application that processes the packets. For example, the packets may be packets of streaming communication (e.g., a video stream, audio stream, or other multimedia stream). By way of another example, packets may be control and management packets like DHCP broadcast packets or router/neighbor advertisements. In the example, the client device may include functionality to process the streaming communication and present the stream to a user viewing an output device on the client device. In one or more embodiments, each client device (120X, 120Y) is a source of one or more data packets (or at least packet payloads) destined for the external network device (154). In particular, a client device may execute an application(s) that generates the data packets (or at least packet payloads).

In one or more embodiments, the IP subnet (100) is effectively a cluster of network devices including a master network device (144) and multiple slave network devices: Slave Network Device A (142A), Slave Network Device B (142B), Slave Network Device C (142C). The master network device (144) sets up the VPN connection (154) and shares the VPN keys (and any other routing policies) with the slave network devices (142A, 142B, 142C) using separate control path messages. The sharing can be done using control path channels between the network devices (142A, 142B, 142C, 144) which can be secured using keys/certificates installed in these network devices (142A, 142B, 142C, 144).

In one or more embodiments, each client device (120X, 120Y) is connected to the IP subnet (100), and thus the external network device (154), via a slave network device (e.g., 142A, 142B, 142C). Specifically, at a particular moment in time, each client device (120X, 120Y) may be connected to a single slave network device (142A-142C). A slave network device may be connected to any number of client devices. Further, the number of client devices connected to the slave network device may vary between network devices and over time. As shown in FIG. 1, slave network device A (142A) connects client device X (120X) to the IP subnet (100) and the external network device (154). Slave network device C (142C) connects client device Y (120Y) to the IP subnet (100) and the external network device (154).

In one or more embodiments, the VPN connection (150) is the link between the subnet (100) and the external network device (154). In one or more embodiments, the external network device (154) is a controller or a VPN server. The VPN connection (150) may be implemented using an external network (152) (e.g., the Internet). An upstream data packet is a data packet that travels (or will eventually travel) through the VPN connection (150) from the subnet (100) to the external network device (154). The payload of the upstream packet may have been generated by a client device (120X, 120Y). A downstream packet is a data packet that travels (or has traveled) through the VPN connection (150) from the external network device (154) to the subnet (100). The payload of the downstream packet may be destined for a client device (120X, 120Y).

Figure 2:
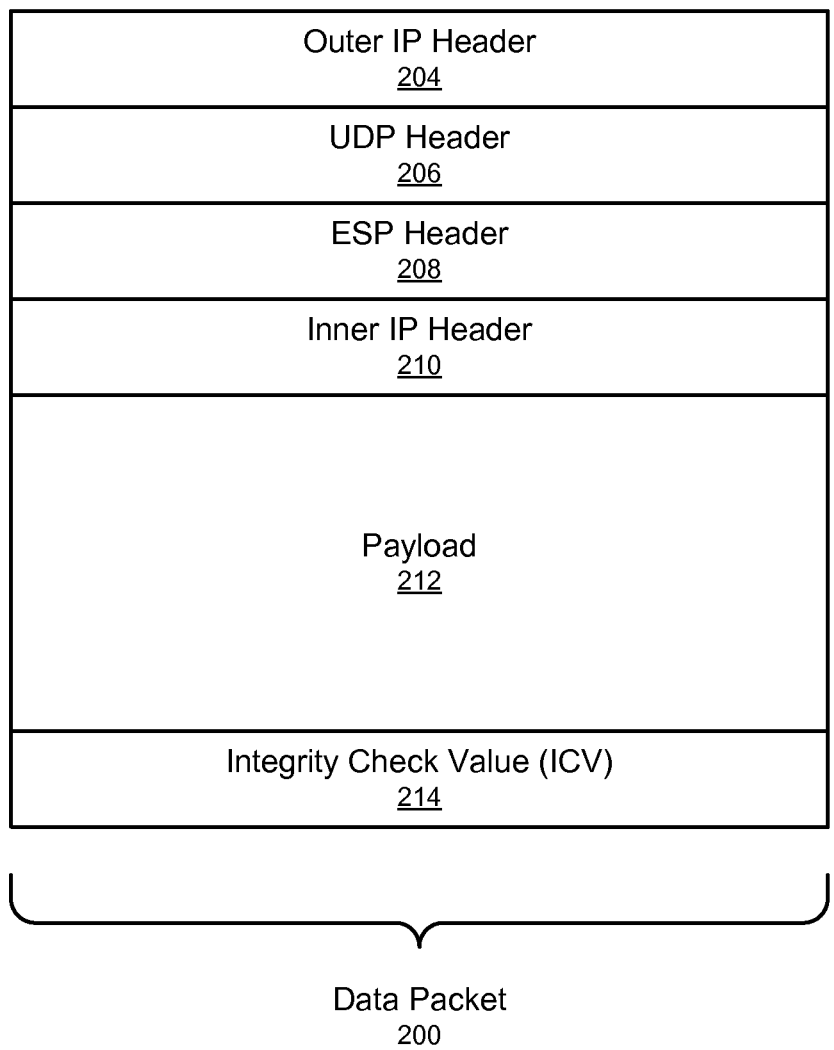
FIG. 2 shows a data packet in accordance with one or more.

FIG. 2 shows a data packet (200) in accordance with one or more embodiments. The data packet (200) may correspond to an upstream packet or a downstream packet. The data packet (200) has multiple components, including: an outer IP header (204), a user datagram protocol (UDP) header (206), an encapsulating security payload (ESP) header (208), an inner IP header (210), a payload (212), and an ICV (214). Each of these components is discussed below. The ordering of these components (202, 204, 206, 208, 210, 212, 214) may differ among embodiments.

In one or more embodiments, the data packet (200) includes the outer IP header (204). The outer IP header (204) specifies the IP addresses of the source network device and the destination network device. For example, in an upstream packet, the source network device may be the master network device (144), while the destination network device may be the external network device (154). In a downstream packet, the reverse is true. In this example, the output IP header (204) specifies the IP addresses of the external network device (154) and the master network device (144).

As another example, the source network device may be slave network device A (142A), while the destination network device may be the master network device (144). In this example, the output IP header (204) specifies the IP addresses of slave network device A (142A) and the master network device (144).

In one or more embodiments, the data packet (200) includes the UDP header (206). The UDP header (206) specifies the source port and the destination port of the source network device and the receiving network device, respectively.

In one or more embodiments, the data packet (200) includes the ESP header (208). The ESP header (208) includes a unique sequence number. This unique sequence number is used to prevent replay/playback attacks.

In one or more embodiments, the data packet (200) includes the inner IP header (210) and the payload (212). Both the inner IP header (210) and the payload (212) may be encrypted. In the upstream direction, the inner IP header (210) specifies the IP address of the client device (e.g., Client X (120X)) that generated the payload (212), and the IP address of the ultimate destination of the payload (212). The ultimate destination may be the external network device (154) or a computing/networking device connected to the external network device (154). In the downstream direction, the inner IP header (210) specifies the IP address of the client device (e.g., Client X (120X)) that will consume the payload (212), and the IP address of the source computing/network device of the payload (212). The source computing/network device of the payload (212) may be the external network device (154) or a computing/network device connected to the external network device (154).

In one or more embodiments, the data packet (200) includes the ICV (214). The ICV (214) is calculated based on the ESP header (208), the encrypted inner IP header (210), and the encrypted payload (212). The ICV (214) may be a checksum or hash sum of the ESP header (208), the encrypted inner IP header (210), and the encrypted payload (212).

Referring back to FIG. 1, each network device (142A-142C, 144) is a hardware device that is configured to receive data packets and transmit the data packets to the client devices connected to the network device. A network device might also be configured to receive data packets and transmit the data packets to other network devices (142A-142C, 144). Each network device (142A-142C, 144) may correspond to an access point, a controller, a gateway, a switch, a server, or any combination thereof. For example, the master network device (144) and all of the slave network devices (142A, 142B, 142C) may be access points. The network device (142A-142C, 144) may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

In one or more embodiments, some or all of the slave network devices (142A-142C) are configured to encrypt and/or decrypt the payload and the inner IP header of a data packet (e.g., data packet (200)). The encryption keys may be provided to the slave network devices (142A-142C) by the master network device (144) (i.e., using secured channels).

In one or more embodiments, some or all of the slave network devices (142A-142C) are configured to generate and/or verify the ICV of a data packet (e.g., data packet (200)). Generating the ICV may require performing a checksum or hash sum of the ESP header, the inner IP header, and the payload of the data packet. Verifying the ICV may include first generating the ICV and then, comparing the generated ICV against the ICV that arrived with (i.e., that is already part of) the data packet.

In one or more embodiments, some or all of the slave network devices (142A-142C) are configured to send data packets to other slave network devices and/or to the master network device (144) by populating the outer IP header and UDP header accordingly.

In one or more embodiments, the master network device (144) is configured to generate sequence numbers for data packets. Specifically, in the upstream direction, the master network device (144) may maintain a counter that increments for each upstream data packet. The sequence number assigned to the upstream data packet may be the current value of the counter. The ESP header of the data packet is populated with the sequence number. For example, if the current value of the counter is 127, a sequence number of 127 will be assigned to the current upstream data packet. The counter will be incremented to 128 for the next upstream data packet, and a sequence number of 128 will be assigned to the next upstream data packet.

In one or more embodiments, the master network device (144) is configured to verify sequence numbers. Specifically, in the downstream direction, the sequence numbers of downstream data packets are compared against a list, counter, or other data structure that records/tracks the sequence numbers of downstream data packets that have already arrived. If there is a match (i.e., the sequence number has been observed before), the downstream data packet may be dropped/discarded. Those skilled in the art, having the benefit of this detailed description, will appreciate that the use of sequence numbers in both the upstream and downstream directions helps prevent playback/replay attacks.

In one or more embodiments, the master network device (144) has at least the same functionality as the slave network devices (142A-142C). In one or more embodiments, the master network device (144) is configured to partially decrypt a data packet. Specifically, the master network device may be configured to decrypt the inner IP header of the data packet, but not the payload. The inner IP header is decrypted to identify the client device destined to consume the payload. The master network device (144) may then send the data packet (for further decryption) to the slave network device connected to the identified client device.

As discussed above, embodiments provide a system, method, and non-transitory computer readable storage medium for distributing/offloading the virtual private network (VPN) functionality of a master network device among one or more slave network devices in a subset. Broadly, there are three ways/schemes to offload one or more of the VPN functions to a slave network device: (i) Maximum offloading, where the aim is to perform the maximum number of functions possible at the slave network device; (ii) Partial offloading, where the aim is to keep the traffic between slave network device and the master device encrypted; and (iii) a middle ground, which is a combination of maximum offloading and partial offloading. In one or more embodiments, a network administrator selects the offloading scheme.

Maximum Offloading

In the upstream direction, all traffic initially comes to the master network device (144), which adds an additional header (including the assigned sequence number) to the data packet and forwards the data packet randomly to one of the slave network devices (142A-142C). The slave network device (142A-142C) will complete the "encryption" and "authentication" functions, before creating the outer IP header (with source IP and source port of the actual VPN session) and sending it out the VPN connection (150) to the external network device (154).

Those skilled in the art, having the benefit of this detailed description, will appreciate that in this embodiment, the slave network device (142A-142C) ends up generating packets with the master network device's IP address (but slave's own MAC), which could trigger alarm in certain upstream switches. In one or more embodiments, to avoid the alarm, the slave network device (142A-142C) forwards the data packet back to master network device (144), which updates the outer IP header and sends it out the VPN connection (150) to the external network device (154).

In the downstream direction, the data packets from the external network device (154) will first reach the master network device (144), which will then randomly forward the data packet to one of the slave network devices after verifying the uniqueness of the sequence number. At the slave network device (142A-142C), "validation" and "decryption" functions are completed. If the slave network device (142A-142C) has all required forwarding information, it can forward the data packet to the next hop. Otherwise, the data packet may be passed back to the master network device (144) (or a default gateway), so that it can forward the packet to the next hop.

Partial Offloading

In the upstream direction, the slave network device (142A-142C) might perform only the "encryption" function and then pass the data packet to the master network device (144). The master network device (144) will add the sequence number and then calculate and assign the ICV before sending the data packet out the VPN connection (150) to the external network device (154). The payload remains encrypted while in transit between the slave network device (142A-142C) and the master network device (144).

In the downstream direction, the master network device (144) performs the authentication function, verifies the sequence number, and does a "partial decryption"—only the first few blocks of data which includes the inner IP headers. Once the network headers are decrypted, the master network device (144) can identify the next hop slave network device (142A-142C) for this data packet and sends the traffic to it. The complete decryption might only be performed at the slave network device (142A-142C).

Middle Ground

In the upstream direction, the slave network device (142A-142C) performs the "encryption" function and passes the data packet to the master network device (144) (similar to partial offloading scheme). The master network device (144) then assigns a sequence number to the data packet and passes the data packet to one of the slave network device (142A-142C) for completing the outer IP and UDP headers and the ICV.

In downstream direction, the master network device (144) verifies the sequence number of the data packet and forwards the data packet as is to an intermediate slave network device (142A-142C), which will complete the validation and "partial decryption" to identify the next hop. The intermediate slave network device (142A-142C) will forward the still-encrypted data packet to the final slave network device (142A-142C), where the data packet (including the payload) will be decrypted.

The various offloading schemes are discussed in greater detail below.

Figure 3:
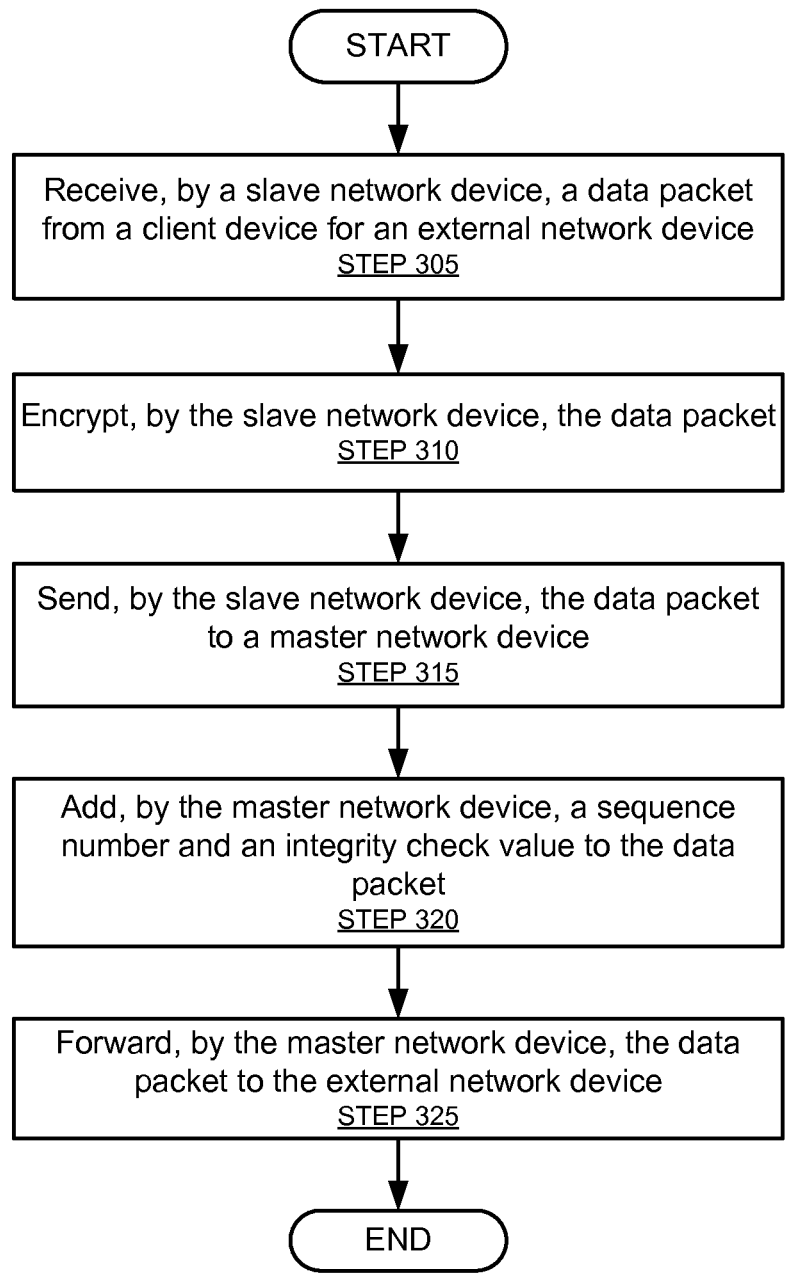
FIGS. 3-5 show flowcharts depicting offloading in accordance with one or more embodiments.

FIG. 3 shows a flowchart in accordance with one or more embodiments. Specifically, the process shown in FIG. 3 depicts partial-offloading in the upstream direction. The process shown in FIG. 3 may be executed, for example, by one or more components (e.g., slave network device A (142A), master network device (144)), discussed above in reference to FIG. 1. One or more steps shown in FIG. 3 may be omitted, repeated, and/or performed in a different order among different embodiments. Accordingly, embodiments should not be considered limited to the specific number and arrangement of steps shown in FIG. 3.

Initially, a slave network device receives a data packet from a client device (STEP 305). The data packet includes a payload and an inner IP header. The inner IP header identifies the IP address of the payload's final destination. The slave network device may belong to an IP subset having a master network device and other slave network devices. The final destination may be outside the IP subset and only accessible from the IP subset via a VPN connection set up by the master network device.

In STEP 310, the slave network device encrypts the data packet. Specifically, the slave network device encrypts the inner IP header and the payload of the data packet. The encryption keys used for the encryption may be provided by the master network device through one or more secured control channels.

In STEP 315, the slave network device sends the encrypted data packet to the master network device. Specifically, the slave network device adds an ESP header, a UDP header, and an outer IP header. The ESP header includes a field/variable to store a sequence number. The UDP header specifies one or more custom ports for communication within the IP subset. The outer IP header includes the IP address of the slave network device (source) and the IP address of the master network device (destination).

In STEP 320, the master network device populates the ESP header with the generated sequence number and calculates an ICV. As discussed above, the sequence number may correspond to the current value of a counter maintained by the master network device and is used to prevent replay/playback attacks. The ICV may be a checksum or hash sum of the ESP header, the encrypted inner IP header, and the encrypted payload. The master network device adds the ICV to the data packet.

In STEP 325, the master network device forwards the data packet over the VPN connection to an external network device. The payload's final destination may be the external network device or another computing device attached the external network device. The forwarding process may require the master network device to update the outer IP header to specify the IP address of the master network device (source) and the IP address of the external network device (destination). The UDP header is also updated to reflect the appropriate ports.

Although the process in FIG. 3 has the master network device adding the sequence number and the ICV to the data packet, in other embodiments, the sequence number and the data packet are sent by the master network device to the same slave network device or a different slave network device. The slave network device then adds the sequence number (received from the master network device) to the data packet, calculates and adds the ICV to the data packet, and then forwards the data packet to the external network device by updating the UDP and outer IP headers.

Figure 4:
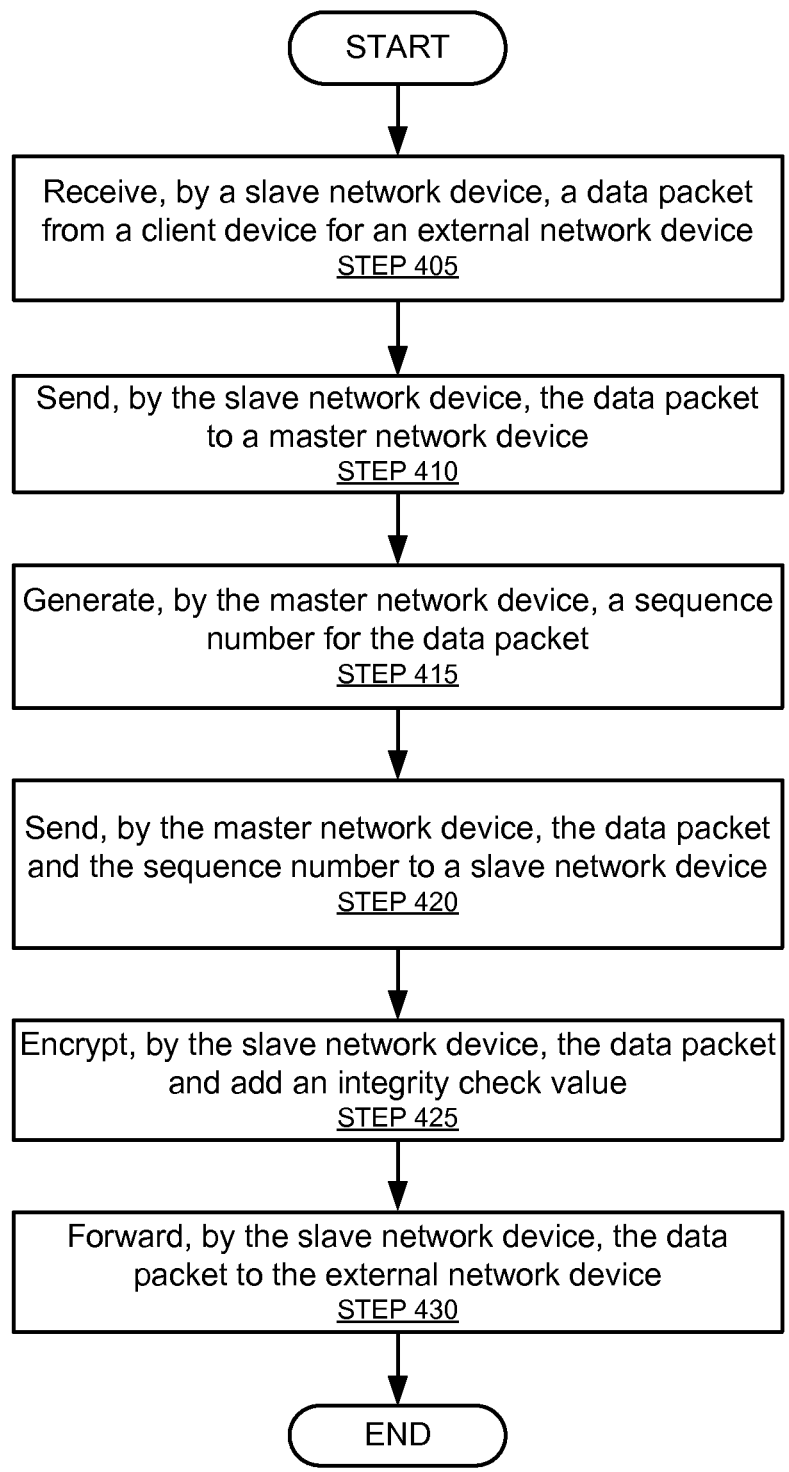

FIG. 4 shows a flowchart in accordance with one or more embodiments. Specifically, the process shown in FIG. 4 depicts maximum-offloading in the upstream direction. The process shown in FIG. 4 may be executed, for example, by one or more components (e.g., slave network device A (142A), slave network device B (142B), master network device (144)), discussed above in reference to FIG. 1. One or more steps shown in FIG. 4 may be omitted, repeated, and/or performed in a different order among different embodiments. Accordingly, embodiments should not be considered limited to the specific number and arrangement of steps shown in FIG. 4.

Initially, a slave network device receives a data packet from a client device (STEP 405). The data packet includes a payload and an inner IP header. The inner IP header identifies the IP address of the payload's final destination. The slave network device may belong to an IP subset having a master network device and other slave network devices. The final destination may be outside the IP subset and only accessible from the IP subset via a VPN connection set up by the master network device.

In STEP 410, the slave network device sends the data packet to the master network device. Specifically, the slave network device adds an ESP header, a UDP header, and an outer IP header to the data packet. The ESP header includes a field/variable to store a sequence number. The UDP header specifies one or more custom ports for communication within the IP subset. The outer IP header includes the IP address of the slave network device (source) and the IP address of the master network device (destination).

In STEP 415, the master network device generates a sequence number for the data packet. As discussed above, the sequence number may correspond to the current value of a counter maintained by the master network device and is used to prevent replay/playback attacks.

In STEP 420, the master network device sends the data packet to a slave network device. The slave network device may be the same slave network device as in STEP 405, or a different slave network device. The data packet may be sent by modifying the outer IP header to specify the IP address of the master network device (source) and the IP address of the slave network device (destination). The data packet may already be populated with the sequence number. Additionally or alternatively, the sequence number is sent separately from the master network device to the slave network device. The slave network device then populates the ESP header of the data packet with the received sequence number.

In STEP 425, the slave network device encrypts the data packet. Specifically, the slave network device encrypts the inner IP header and the payload of the data packet. The encryption keys used for the encryption may be provided by the master network device through one or more secured control channels. The slave network device also calculates an ICV for the data packet and adds the ICV to the data packet.

In STEP 430, the slave network device forwards the data packet to the external network device over the VPN connection. Specifically, the outer IP header may be modified to specify the IP address of the master network device (source) and the IP address of the external network device (destination).

Those skilled in the art, having the benefit of this detailed description, will appreciate that in this embodiment, the slave network device ends up generating packets with the master network device's IP address, but slave network device's own MAC, which could trigger alarm in certain upstream switches. In one or more embodiment, to avoid the alarm, the slave network device forwards the data packet back to master network device, which updates the outer IP header with the MAC address of the master network device and sends it out the VPN connection to the external network device.

Figure 5:
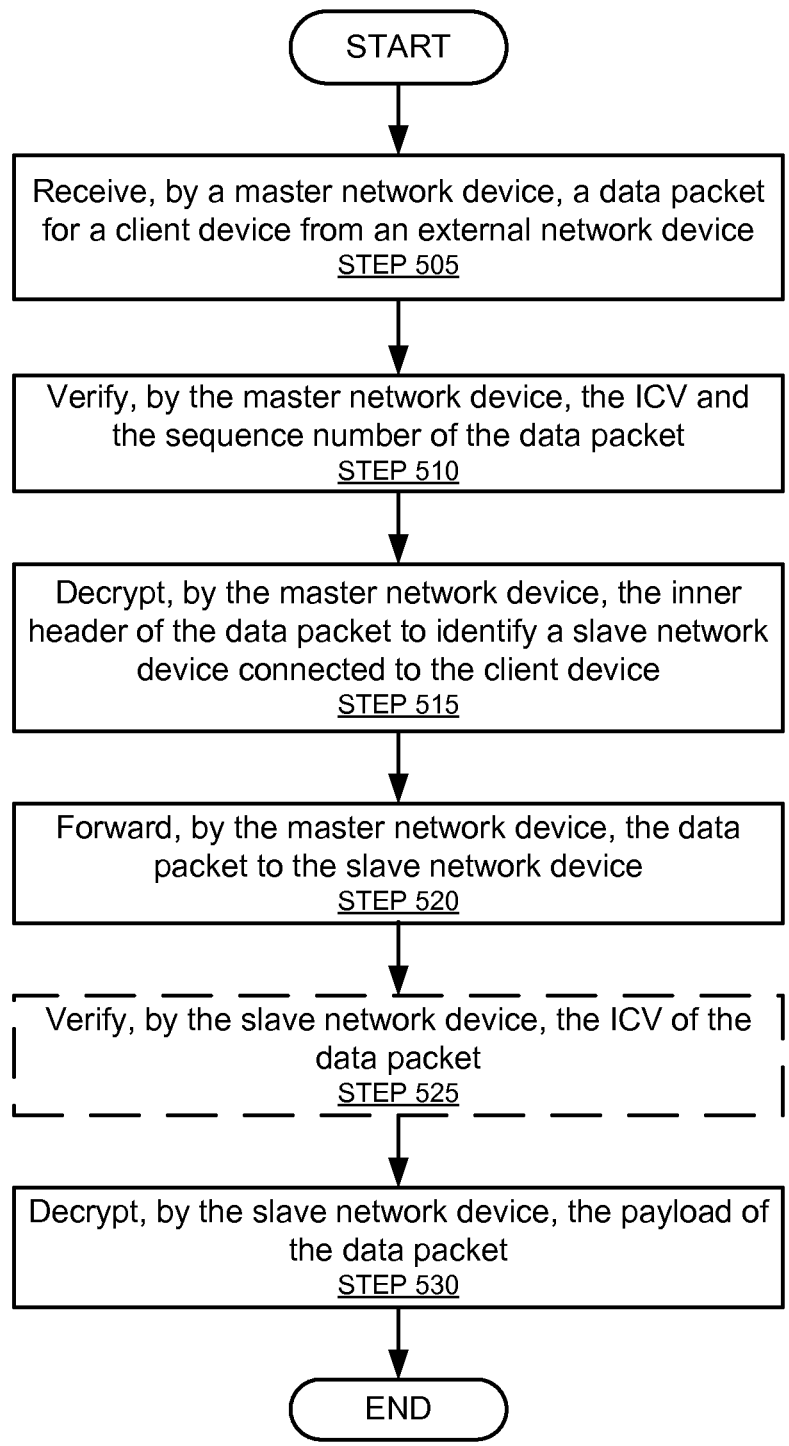

FIG. 5 shows a flowchart in accordance with one or more embodiments. Specifically, the process shown in FIG. 5 depicts offloading in the downstream direction. The process shown in FIG. 5 may be executed, for example, by one or more components (e.g., slave network device A (142A), slave network device B (142B), master network device (144)), discussed above in reference to FIG. 1. One or more steps shown in FIG. 5 may be omitted, repeated, and/or performed in a different order among different embodiments. Accordingly, embodiments should not be considered limited to the specific number and arrangement of steps shown in FIG. 5.

Initially, a master network device receives a data packet from an external network device (STEP 505). The master network device exists in an IP subnet with multiple slave network devices. The payload of the data packet may be encrypted and destined for a client device (target client device) connected to one of the slave network devices. The external network device and the master network device are connected using a VPN connection.

In STEP 510, the master network device verifies the ICV of the data packet and the sequence number in the ESP header of the data packet. Specifically, the master network device calculates the ICV over the ESP header, the encrypted inner IP header, and the encrypted payload of the data packet and compares it with the ICV already present in the data packet. If there is a match, the authenticity and integrity of the data packet is confirmed. Otherwise, the data packet may be discarded. Then, the master network device verifies the sequence number in the ESP header of the data packet. As discussed above, verifying the sequence number may include confirming that no earlier downstream packets received by the master network device had the same sequence packet number. If an earlier downstream packet received by the master network device had the same sequence number, the data packet is discarded.

In STEP 515, the master network device partially decrypts the data packet. Specifically, the master network device decrypts the inner header, but not the payload, of the data packet. By decrypting the inner header, the master network device may determine/identify the slave network device connected to the target client device (e.g., by accessing a mapping table), and then forward the data packet (with the payload still encrypted) to the slave network device (or at least the next network hop in the route to the slave network device). Forwarding the data packet may include updating the outer IP header to specify the IP address of the master network device (source) and the IP address of the slave network device (destination) (STEP 520).

In STEP 525, the slave network device verifies the ICV of the data packet. Specifically, the slave network device calculates the ICV over the ESP header, the encrypted inner IP header, and the encrypted payload of the data packet, and compares it with the ICV already present in the data packet. If there is a match, the integrity of the data packet is confirmed. Otherwise, the data packet may be discarded. In one or more embodiments of the invention, STEP 525 is optional.

In STEP 530, the slave network device decrypts the data packet including the payload of the data packet. Decryption may be executed using encryption keys provided by the master network. The slave network device provides at least the decrypted payload to the target client device. Additionally or alternatively, the payload may be decrypted by a network hop (i.e., another slave network device) in the route between the master network device and the slave device.

Additionally or alternatively to the process shown in FIG. 5, the master network device may select a slave network device at random. In such embodiments, the master network device forwards, without performing partial decryption, the data packet to the randomly selected slave network device. The random slave network device may verify the ICV of the data packet. Then, the random slave network device only decrypts enough bits to read the inner IP header (but not the payload) and identifies the slave network device connected to the target client device from the inner IP header. The random slave network device then sends the data packet, with the payload still encrypted, to the slave network device (or to at least the next network hop in the route to the slave network device). Additionally or alternatively, the random network device may also decrypt the payload of the data packet. In such embodiments, the data packet, with the payload in plaintext, is sent to the next network hop or the slave network device connected to the target client device.

Figure 6:
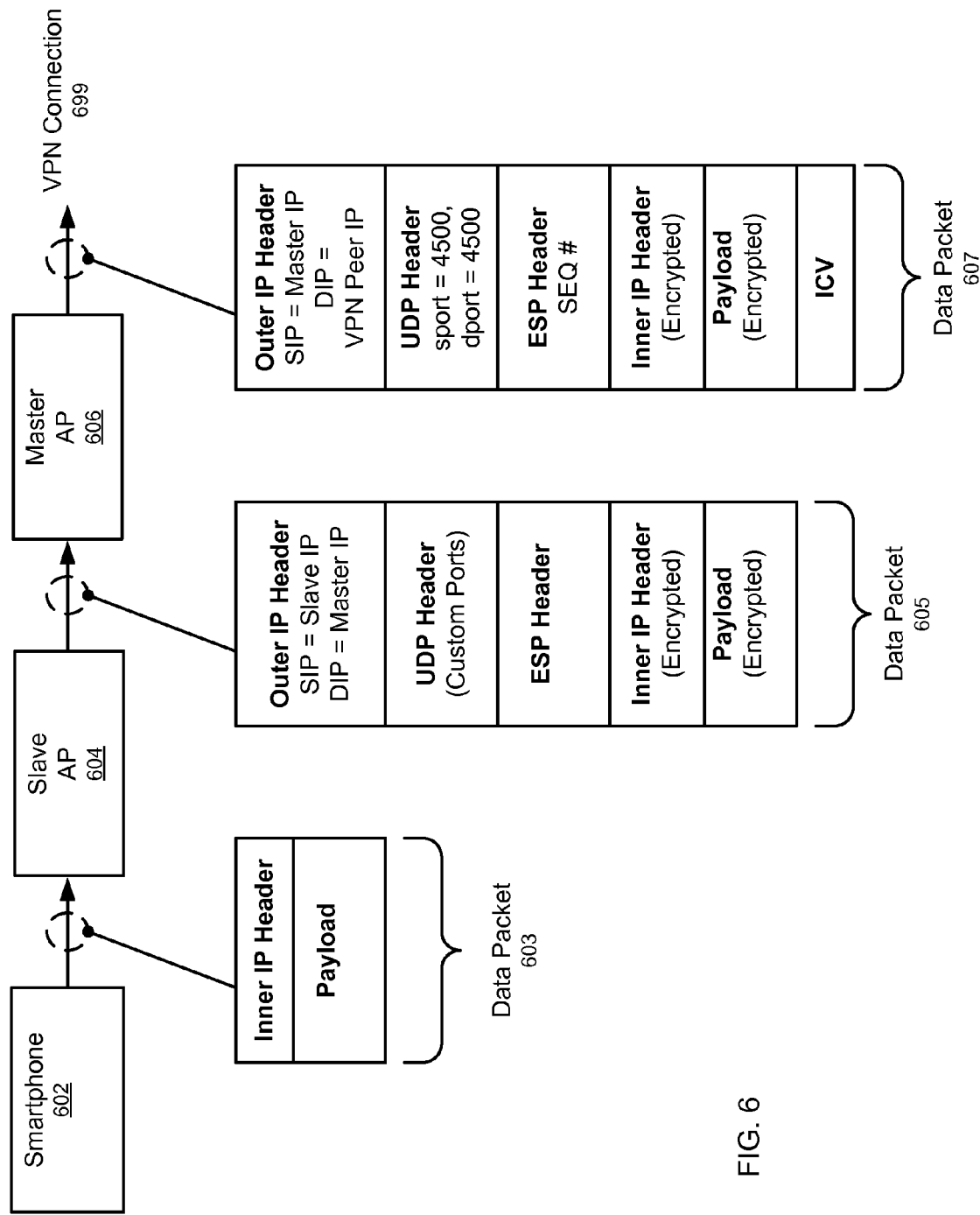
FIGS. 6 and 7 show examples in accordance with one or more embodiments.

FIG. 6 shows an example of upstream partial off-loading in accordance with one or more embodiments. As shown in FIG. 6, a smartphone (602) is connected to a slave access point (AP) (604). The slave AP (604) is connected to a master AP (606) that has set up a VPN connection (699). The slave AP (604) and the master AP (606) are in the same IP subset. Moreover, the smartphone (602) is a client device connected wirelessly to the slave AP (604). Now assume the smartphone (602) generates a payload for consumption by a computing device (not shown) outside the subnet, and only accessible to the subnet by the VPN connection (699).

The slave AP (604) receives data packet (603) from the smartphone (602). The data packet (603) includes the payload and an inner IP header specifying the computing device. The slave AP (604) encrypts the inner IP header and the payload. The slave AP (604) also adds an ESP header (with missing sequence number), a UDP header, and an outer IP header. The outer IP header has a source IP address (SIP) set to the IP address of the slave AP (604) and a destination IP address (DIP) set to the master AP (606). Data packet (605) is the data packet sent from the slave AP (604) to the master AP (606). Data packet (605) has the encrypted inner IP header and encrypted payload, the ESP header, and the outer IP header with the appropriate SIP and DIP to send the data packet (605) to the master AP (606).

Still referring to FIG. 6, the master AP (606) generates a sequence number and populates the ESP header with the sequence number. Further, the master AP (606) also calculates an ICV and adds the ICV to the data packet. Further still, the master AP (606) updates the outer IP header. The SIP is set to the IP address of the master IP, while the DIP is set to the IP address of an external network device connected to the master AP (606) over the VPN network (699). The ICV, the sequence number, and the modified outer IP header are shown in data packet (607), leaving master AP (606) for transit across the VPN connection (699).

Figure 7:
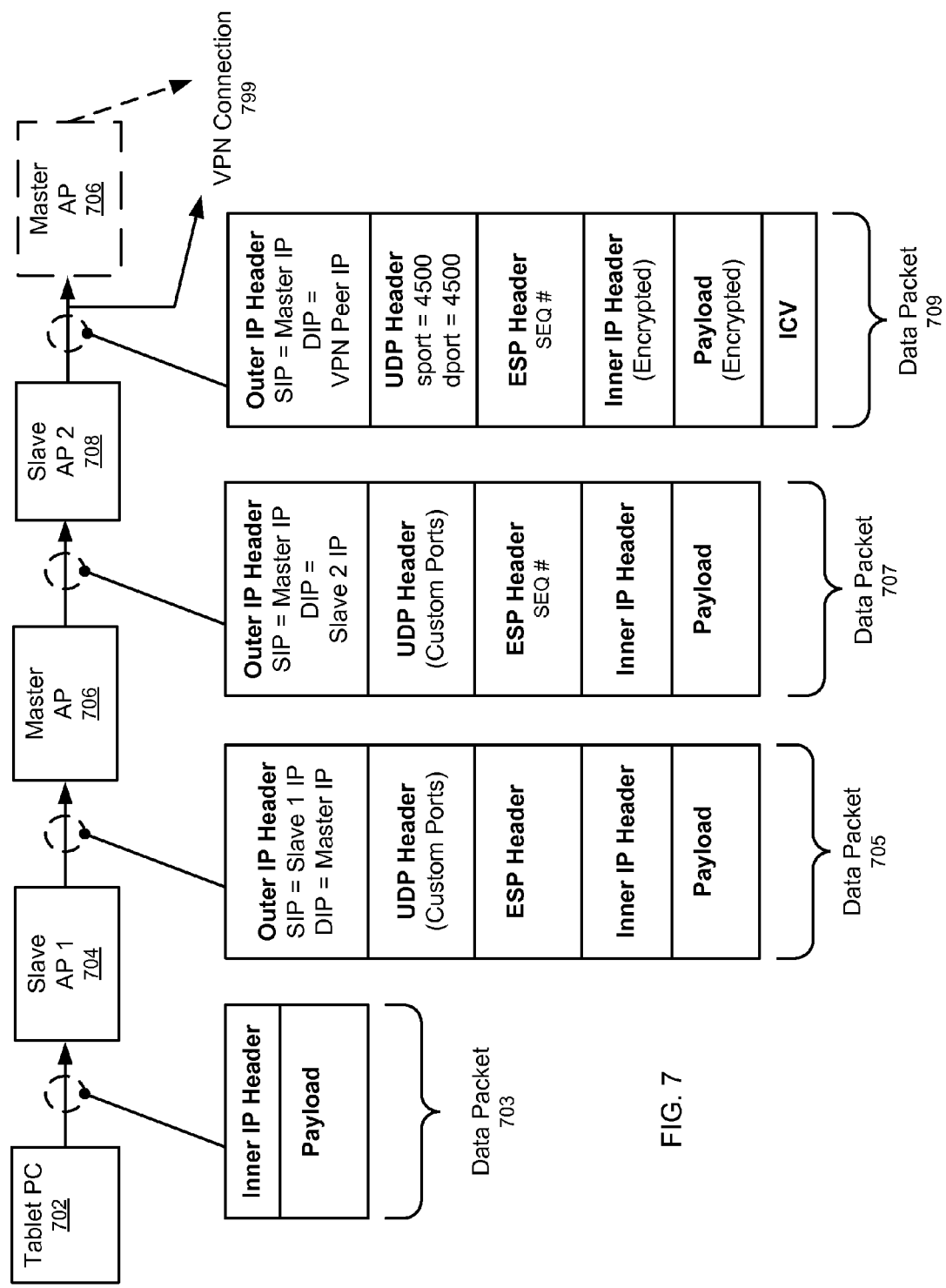

FIG. 7 shows an example of upstream maximum offloading in accordance with one or more embodiments. As shown in FIG. 7, a tablet PC (702) is connected to a first slave AP (704). The first slave AP (704) is connected to a master AP (706) that has set up a VPN connection (799). The master AP (706) is also connected to a second slave AP (708). The first slave AP (704), the second slave AP (708), and the master AP (706) are in the same IP subset. Moreover, the tablet PC (702) is a client device connected wirelessly to the first slave AP (704). Now assume the tablet PC (702) generates a payload for consumption by a computing device (not shown) outside the subnet and only accessible to the subnet by the VPN connection (799).

The first slave AP (704) receives data packet (703) from the tablet PC (702). The data packet (703) includes the payload and an inner IP header specifying the computing device that will consume the payload. The first slave AP (704) adds an ESP header (with missing sequence number), a UDP header, and an outer IP header to the data packet (703). The outer IP header has its source IP address (SIP) set to the IP address of the first slave AP (704) and its destination IP address (DIP) set to the master AP (706). Data packet (705) is the data packet sent from the first slave AP (704) to the master AP (706). Data packet (705) has the ESP header and the outer IP header with the appropriate SIP and DIP to send the data packet (705) to the master AP (706).

Still referring to FIG. 7, the master AP (706) generates a sequence number and populates the ESP header with the sequence number. Further, the master AP (706) modifies the outer IP header of the data packet (705) by setting the SIP to the IP address of the master AP (706) and the DIP to the IP address of the second slave AP (708). Data packet (707) is the data packet as sent to the second slave AP (708).

The second slave AP (708) encrypts the inner IP header and the payload of the data packet (707). Further, the second slave AP (708) also calculates the ICV and adds the ICV to the data packet. Further still, the second slave AP (708) modifies the outer IP header by setting the SIP to the IP address of the master AP (706) and the DIP to the IP address of the external network device connected to the master AP (706) over the VPN connection (799).

In one or more embodiments, the second slave AP (708) can forward the data packet (709) directly to the external network device across the VPN connection (799). Additionally or alternatively, the second slave AP (708) passes the data packet (709) back to the master AP (706), such that the outer IP header can be updated with the MAC address of the master network device. This update is performed such that the MAC address reflected in the outer IP header and the SIP address correspond to the same device (i.e., master AP (706)). If the MAC address in the outer IP header and the SIP address in the outer IP header correspond to different physical devices, this may trigger alarms in switches upstream.

Embodiments may have one or more of the following advantages: the ability to reduce the processing load on a master network device in a cluster/subset; the ability to reduce the likelihood of the master network device becoming a bottleneck; the ability to have VPN functions (e.g., encryption) performed by slave network devices instead of the master network device; the ability to mix different types of offloading; the ability to use one type of offloading for upstream packets and a different type of offloading for downstream packets; the ability to keep payloads encrypted between slave network devices and master network devices in both the upstream and the downstream directions, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising a plurality of access points, the plurality of access points comprising at least a first access point and a second access point, wherein the system is configured to perform operations comprising:
   receiving, by the second access point from a client device, an encrypted data packet to be transmitted to a device outside of the system;
   forwarding the data packet by the second access point to the first access point;
   decrypting, by the first access point, a header of the data packet to identify the device outside of the system;
   assigning, by the first access point, a first sequence number to the data packet to be used for transmitting the data packet outside of the system;
   forwarding the data packet by the first access point to the second access point;
   decrypting, by the second access point, a payload of the data packet; and
   transmitting the decrypted data packet with the first sequence number to the device outside of the system.

2. The system of claim 1, wherein the transmitting operation is performed by the first access point.

3. The system of claim 1, wherein the transmitting operation is performed by an access point other than the first access point.

4. The system of claim 1, wherein the first access point is a master access point and wherein the second access point is a slave access point.

5. The system of claim 1, wherein the operations further comprise:
   receiving, by a third access point from a second client device, a second data packet to be transmitted to the device outside of the system;
   forwarding the data packet by the third access point to the first access point;
   assigning; by the first access point, a second sequence number to the second data packet to be used for transmitting the data packet outside of the system, the second sequence number being one higher than the first sequence number;
   transmitting the data packet with the assigned second sequence number to the device outside of the system.

6. The system of claim 1, wherein the operations further comprise: modifying, by the first access point, the data packet to include an Integrity Check Value (ICV) based on the first sequence number.

7. The system of claim 1, wherein the operations further comprise:
   prior to the transmitting operation:
      forwarding, by the first access point to the second access point or a third access point, the data packet and the assigned first sequence number; and
      modifying, by the second access point or the third access point, the data packet to include an Integrity Check Value (ICV) based on the first sequence number.

8. The system of claim 7, wherein the operations further comprise:
wherein the transmitting operation is performed by one of the second access point or the third access point that modifies the data packet to include the ICV.

9. The system of claim 7, wherein the operations further comprise:
forwarding, by the second access point or the third access point, the modified data packet with the ICV to the first access point;
wherein the transmitting operation is performed by the first access point.

10. The system of claim 1, wherein the operations further comprise prior to the forwarding operation: encrypting, by the second access point, the data packet to obtain an encrypted data packet which is forwarded to the first access point in the forwarding operation.

11. The system of claim 1, wherein the operations further comprise: encrypting, by an access point other than the first access point, the data packet after the assigning operation by the first access point.

12. The system of claim 1, wherein the operations further comprise modifying the data packet to include an Internet Protocol (IP) address of the first access point as the source IP address prior to the transmitting operation.

13. The system of claim 12, wherein modifying the data packet to include the IP address of the first access point as the source IP address is performed by an access point other than the first access point.

14. A system comprising a plurality of access points, the plurality of access points comprising at least a first access point and a second access point, wherein the system is configured to perform operations comprising:
receiving, by the first access point from a device outside the system, a data packet comprising a payload for a client device connected to the second access point;
decrypting, by the first access point, a header of the data packet to identify client device;
verifying, by the first access an integrity Check Value (ICV) of the data packet;
verifying, by the first access point, a sequence number of the data packet;
forwarding the data packet to the second access point without the first access point decrypting the payload of the data packet; and
decrypting, by the second access point, the payload of the data packet.

15. The system of claim 14, the operations further comprising:
selecting, by the first access point, a third access point at random;
forwarding, by the first access point, the data packet to the third access point;
decrypting, by the third access point, an inner header of the data packet to identify the second access point as a destination of the data packet; and
decrypting, by the second access point; the payload of the data packet.

16. The system of claim 15, the operations further comprising:
verifying, by at least one selected from a group consisting of the third access point and the second access point, the ICV of the data packet.

17. The system of claim 14, the operations further comprising:
decrypting, by the first access point, an inner header of the data packet to identify a third access point as a network hop between the first access point and the second access point; and
forwarding, by the first access point; the data packet to the third access point, wherein the data packet is forwarded to the second access point by the third access point.

18. The system of claim 17, the operations further comprising:
decrypting, by the third access point, the payload of the data packet before the data packet is forwarded to the second access point.

19. The system of claim 14, the operations further comprising:
decrypting, by the first access point, an inner header of the data packet to identify the second access point as a destination of the data packet, wherein the data packet is forwarded to the second access point by the first access point; and
decrypting, by the second access point, the payload of the data packet.

20. The system of claim 14, wherein the first access point is a master access point and the second access point is a slave access point, and wherein the device outside the system and the first access point are connected by a virtual private network (VPN) connection.

* * * * *